US005480583A

United States Patent [19]

Rivas et al.

[11] Patent Number: 5,480,583

[45] Date of Patent: Jan. 2, 1996

[54] EMULSION OF VISCOUS HYDROCARBON IN AQUEOUS BUFFER SOLUTION AND METHOD FOR PREPARING SAME

[75] Inventors: Hercilio Rivas, Caracas; Socrates Acevedo, Edo. Miranda; Xiomara Gutierrez, Caracas, all of Venezuela

[73] Assignee: Intevep, S.A., Caracas, Venezuela

[21] Appl. No.: 413

[22] Filed: Jan. 4, 1993

Related U.S. Application Data

[63] Continuation-in-part of Ser. No. 801,472, Dec. 2, 19915, 419,852.

[51] Int. Cl.[6] .............................. B01J 13/00; C10L 1/32; F17D 1/17

[52] U.S. Cl. .......................... 252/311.5; 252/312; 44/301

[58] Field of Search .................................... 252/312, 314, 252/8.551, 311.5, 311; 44/300, 301; 137/13; 507/232, 263, 264, 267

[56] References Cited

U.S. PATENT DOCUMENTS

| | | | |
|---|---|---|---|
| 3,380,531 | 4/1968 | McAuliffe et al. | 252/8.551 |
| 3,487,844 | 1/1970 | Simon et al. | 137/13 |
| 3,927,716 | 12/1975 | Burdyn et al. | 166/270 |
| 4,513,017 | 4/1985 | Moran et al. | 426/603 |
| 4,801,304 | 1/1989 | Polanco et al. | 252/312 |
| 5,068,043 | 11/1991 | Thigpen et al. | 252/8.551 |
| 5,283,001 | 2/1994 | Gregoli et al. | 252/312 |
| 5,411,558 | 5/1995 | Taniguchi et al. | 44/301 |
| 5,419,852 | 5/1995 | Rivas et al. | 252/312 |

OTHER PUBLICATIONS

Acevedo et al., "Asphaltenes and resins from Orinoco basin", *Fuel,* 1985, vol. 64, Dec., pp. 1741–1747.

Acevedo et al., "Isolation and characterization of natural surfactants from extra heavy crude oils, asphaltenes and maltenes. Interpretation of their interfacial tension–pH behavior in terms of ion pair formation", *Fuel*, vol. 71, No. 6, Jun. 1992, pp. 519–524.

Acevedo et al., "Isolation and characterization of natural surfactants present in extra heavy crude oils", *J. Dispersion Science and Technology*, 5(1), 1–18 (1984).

*Primary Examiner*—Richard D. Lovering
*Assistant Examiner*—Daniel S. Metzmaier
*Attorney, Agent, or Firm*—Bachman & LaPointe

[57] ABSTRACT

A method for forming a stable emulsion of a viscous hydrocarbon in an aqueous buffer solution includes the steps of: providing a viscous hydrocarbon containing an inactive natural surfactant and having a salt content by weight of less than or equal to about 15 ppm and having a water content by weight of less than or equal to about 0.1%; forming a solution of a buffer additive in an aqueous solution to provide a basic aqueous buffer solution, the buffer additive being operative to extract and activate the inactive natural surfactant from the viscous hydrocarbon; and mixing the viscous hydrocarbon with the aqueous buffer solution at a rate sufficient to provide an emulsion of the viscous hydrocarbon in the aqueous buffer solution, whereby the buffer additive extracts the inactive natural surfactant from the viscous hydrocarbon into the aqueous buffer solution and activates the inactive natural surfactant so as to stabilize the emulsion. According to the invention, the buffer additive is a water soluble amine. The inactive natural surfactant contained in the viscous hydrocarbon includes carboxylic acids, phenols, esters, and mixtures thereof. Bimodal emulsions, having two distinct droplet size distributions, are also formed according to the method of the present invention and have improved viscosity characteristics.

1 Claim, No Drawings

EMULSION OF VISCOUS HYDROCARBON IN AQUEOUS BUFFER SOLUTION AND METHOD FOR PREPARING SAME

This application is a continuation-in-part of U.S. patent application Ser. No. 07/801,472, filed Dec. 2, 1991, now U.S. Pat. No. 5,419,852.

BACKGROUND OF THE INVENTION

The invention relates to an emulsion of a viscous hydrocarbon in an aqueous buffer solution for use as a combustible fuel.

Low gravity viscous hydrocarbons are found in large supply in Canada, Russia, the United States, China and Venezuela, and are normally liquids with viscosities ranging from 10,000 cp to more than 500,000 cp at ambient temperatures. These hydrocarbons are typically produced by numerous methods including steam injection, mechanical pumping, mining techniques and combinations of these methods.

Once produced, such hydrocarbons are useful as combustible fuel once they are desalted and dehydrated and have been treated to remove other undesirable constituents. As a liquid fuel, however, these hydrocarbons are too viscous for practical use. Thus, such viscous hydrocarbons are formed into hydrocarbon in water emulsions which have improved viscosity and, accordingly, improved flow characteristics. When formed with a high ratio of hydrocarbon material to water, these emulsions are an excellent combustible fuel. However, the emulsion is not stable and rapidly breaks if not stabilized with surfactants or emulsifiers. Unfortunately, commercial emulsifiers are expensive and the cost of the emulsion is therefore increased. This added cost obviously adversely impacts the viability of using viscous hydrocarbons to form combustible fuel emulsions.

Viscous hydrocarbons are known to naturally contain materials which are potential surfactants. It would of course be desirable to activate such materials so as to provide natural surfactants to stabilize the emulsion without the additional expense of commercial emulsifiers, thereby providing a more practical alternative for the use of viscous hydrocarbons in forming combustible fuel emulsions. The materials naturally contained in viscous hydrocarbons which are potential surfactants include numerous carboxylic acids, esters and phenols which, in basic pH environment, can be activated as natural surfactants. Sodium hydroxide has been used as an additive to provide the proper pH. However, sodium hydroxide is unable to keep the pH of the aqueous phase constant so that the proper pH, the activated surfactant and the emulsion itself are all short lived.

It is desirable, accordingly, to provide an emulsion stabilized with natural surfactants which does not require the addition of commercial surfactants and which emulsion resists aging and is useful as a combustible liquid fuel.

Accordingly, it is the principal object of the present invention to provide a combustible emulsion of a viscous hydrocarbon in water which emulsion utilizes the natural surfactants of the hydrocarbon to provide stability.

It is a further object of the invention to provide a method for forming such a combustible emulsion.

It is a still further object of the invention to provide such an emulsion and method whereby the emulsion formed is a bimodal emulsion having improved viscosity characteristics.

Other objects and advantages will appear hereinbelow.

SUMMARY OF THE INVENTION

The foregoing objects and advantages are attained by the disclosed emulsion and method for preparing same.

According to the invention, a stable emulsion of a viscous hydrocarbon in an aqueous buffer solution is formed by a method comprising the steps of providing a viscous hydrocarbon containing an inactive natural surfactant and having a salt content by weight of less than or equal to about 15 ppm and a water content by weight of less than or equal to about 01.%; forming a solution of a buffer additive in an aqueous solution to provide a basic aqueous buffer solution, the buffer additive being operative to extract and activate the inactive natural surfactant from the viscous hydrocarbon; and mixing the viscous hydrocarbon with the aqueous buffer solution at a rate sufficient to provide an emulsion of the viscous hydrocarbon in the aqueous buffer solution, whereby the buffer additive extracts the inactive natural surfactant from the viscous hydrocarbon into the aqueous buffer solution and activates the inactive natural surfactant so as to stabilize the emulsion.

According to the invention, the buffer additive is preferably a water soluble amine, and the inactive natural surfactant is selected from the group consisting of carboxylic acids, phenols, esters, and mixtures thereof.

According to a preferred embodiment of the invention, a bimodal emulsion is formed by a method wherein the mixing step includes a first mixing step wherein a first emulsion is prepared having a large droplet size $D_L$ of between about 10 to about 40 μm, and a second mixing step wherein a second emulsion is prepared having a small droplet size $D_S$ of less than or equal to about 5 μm, the method further including the step of mixing the first emulsion with the second emulsion so as to form a bimodal emulsion having a dispersed phase characterized by two droplet sizes corresponding to $D_L$ and $D_S$.

DETAILED DESCRIPTION

The invention relates to an emulsion of a viscous hydrocarbon in an aqueous buffer solution which emulsion is useful as a combustible liquid fuel. The invention further relates to a method for preparing such a combustible emulsion without the use of commercial emulsifier or surfactant materials.

The present invention relates specifically to an emulsion and a method for forming an emulsion from a processed viscous hydrocarbon to provide a stable emulsion of the viscous hydrocarbon in an aqueous buffer solution without requiring commercial surfactants for stability. The emulsion so formed, referred to herein as the commercial emulsion sold by Intevep, S. A. under the trademark ORIMULSION™, is suitable for combustion as a liquid fuel and other end uses such as transportation to a refinery for further processing.

Naturally occurring viscous hydrocarbon materials are produced from deep wells through a number of mechanisms such as steam flooding, pumping, mining techniques and the like. Such natural viscous hydrocarbons are typically characterized, for example, by the following chemical and physical properties: C wt. % of 78.2 to 85.5; H wt. % of 9.0 to 10.8; O wt. % of 0.2 to 1.3; N wt. % of 0.50 to 0.70; S wt. % of 2.00 to 4.50; Ash wt. % of 0.05 to 0.33; Vanadium, ppm of 50 to 1000; Nickel, ppm of 10 to 500; Iron, ppm of 5 to 100; Sodium, ppm of 10 to 500; Gravity, °API of 0 to 16.0; Viscosity (cSt), 122° F. of 100 to 5,100,000; Viscosity (cSt), 210° F. of 10 to 16,000; LHV (BTU/LB) of 15,000 to 19,000; and Asphaltenes, wt. % of 5.0 to 25.0.

These naturally occurring viscous hydrocarbons are accompanied during production by formation water in at least small, and usually widely varying amounts. Although, as shown above, the hydrocarbon generally has a very high viscosity, primary emulsions formed downhole of the hydrocarbon in formation water can greatly reduce the viscosity so as to allow the hydrocarbon to be produced and transported to treatment stations, where the emulsion is typically degassed and desalted, and the primary emulsion is broken to separate away other undesirable constituents with the formation water. Such processing typically yields a viscous hydrocarbon having a salt content by weight of about 15 ppm or less, preferably about 10 ppm or less, and a water content by weight of about 0.1% or less, preferably 0%. The processed viscous hydrocarbon so obtained is the preferable starting material for forming the emulsion of the present invention and may, according to the present invention, be reconstituted without commercial emulsifiers into an emulsion such as the aforesaid ORIMULSION™ commercial product. U.S. Pat. No. 4,795,478, incorporated herein by reference, contains a detailed description of a method for processing naturally occurring viscous hydrocarbons to obtain processed viscous hydrocarbon suitable for forming ORIMULSION™, which processed viscous hydrocarbon is suitable starting material for the emulsion of the present invention. A treated Cerro Negro bitumen, for example, may suitably have the following physical and chemical properties:

CHARACTERISTICS OF
TYPICAL TREATED CERRO NEGRO BITUMEN

| | | |
|---|---|---|
| Water Content | (% w/w) | 0.02 |
| Carbon | (% p/p) | 83.53 |
| Hydrogen | (% p/p) | 11.48 |
| Ash | (% p/p) | 0.102 |
| Sulfur | (% p/p) | 3.76 |
| Total Nitrogen | (ppm) | 8,376.00 |
| Magnesium | (ppm) | 21.92 |
| Vanadium | (ppm) | 599.0 |
| Iron | (ppm) | 8.71 |
| Nickel | (ppm) | 124.13 |
| sodium | (ppm) | 9.13 |
| calcium | (ppm) | 88.19 |
| Conradson Carbon | (ppm) | 15.18 |
| Flash Point | (°F.) | 246.00 |
| Melting Point | (°F.) | 75.00 |
| Heating Power Raw | (BTU/lb) | 19,005.00 |
| Heating Power Net | (BTU/lb) | 17,958.00 |

The desired processed viscous hydrocarbon starting material may suitably be obtained as follows. The viscous hydrocarbon material is produced downhole, for example, through diluent injection of kerosene so as to provide a hydrocarbon having an API gravity of about 14 with ta viscosity low enough to allow the hydrocarbon to be pumped to the surface to treatment stations for conventional degassing, desalting and dehydration. The diluent is then removed, for example in a distillation tower, and a degassed, desalted and dehydrated viscous hydrocarbon results. This resulting degassed, desalted and dehydrated viscous hydrocarbon is then suitable for use in preparing commercial ORIMULSION™ products.

According to the invention, a combustible emulsion of the processed viscous hydrocarbon is formed in an aqueous buffer solution containing a buffer additive which extracts and activates natural surfactants from the viscous hydrocarbon so as to stabilize the emulsion without requiring commercial surfactants.

Most naturally occurring viscous hydrocarbon material contains inactive surfactants including carboxylic acids, phenols and esters which, under proper conditions, can be activated as surfactants. It is known, for example, that these surfactants can be activated for a short time with NaOH. NaOH provides a basic solution in which the inactive natural surfactants can be activated, but emulsions so formed are not stable because the NaOH is rapidly depleted by other constituents in the hydrocarbon.

According to the invention, a buffer additive is used which provides a much broader and longer lasting window during which the solution containing the additive has a basic pH, preferably between about 11 to about 13, and therefore yields a more stable emulsion. The buffer additive serves to raise and buffer the pH of the continuous aqueous phase of the emulsion. The buffer additive extracts and activates the natural surfactants from the viscous hydrocarbon, into the aqueous buffer solution, thus stabilizing the viscous hydrocarbon-in-aqueous buffer solution emulsion without the use of costly commercial surfactants or emulsifiers.

According to the invention, the buffer additive is a water soluble amine. Amines are nitrogen compounds which may be derived from ammonia by replacing one or more hydrogens with an alkyl group. Amines having a single alkyl group such as, for example, isopropylamine, are suitable for providing stable emulsions. Amines with two or more alkyl groups, however, require the presence of a small amount of an alkali metal, or an alkaline earth metal, referred to herein as an alkali additive, preferably in the form of an alkali metal salt or an alkaline earth metal salt, to activate the inactive natural surfactants of the hydrocarbon. Such multiple group amines include, for example, ethylamine, diethylamine, triethylamine, propylamine, sec-propylamine, dipropylamine, butilamine, sec-butilamine, tetramethylammonium hydroxide, tetrapropylammonium hydroxide, and mixtures thereof.

Suitable alkali additive may include any alkali metal or alkaline earth metal, and may preferably include sodium, calcium and/or magnesium, which may be added in any form, preferably in the form of a salt, such as, for example, sodium chloride, potassium chloride, sodium nitrate, potassium nitrate, calcium nitrate, magnesium nitrate, and mixtures thereof. Such salts are preferable because they are, for the most part, readily and affordably available.

The combustible emulsion is formed by mixing the processed viscous hydrocarbon with an aqueous solution of the buffer additive with sufficient mixing energy to emulsify the mixture and provide an emulsion of the viscous hydrocarbon discontinuous phase in the aqueous buffer solution continuous phase having desired droplet size and viscosity.

The aqueous buffer solution is a solution of the buffer additive in water. The buffer additive is preferably added in a concentration in the aqueous buffer solution of at least about 500 ppm in order to provide a basic aqueous buffer solution, preferably having a pH of between about 11 to about 13. Concentrations of greater than 15,000 ppm are not preferred because no apparent benefit is obtained for the additional cost of adding such additional concentrations of buffer additive. More preferably, buffer additive is added at a concentration of between about 500 ppm to about 10,000 ppm.

When necessary, the alkali additive is added at a concentration of between about 50 ppm to about 500 ppm, preferably between about 50 ppm to about 100 ppm.

When the viscous hydrocarbon and aqueous solution are mixed, the natural surfactants are extracted from the viscous hydrocarbon into the aqueous buffer solution and activated by the buffer additive to provide natural and active surfactants in the aqueous buffer solution continuous phase of the emulsion. The aqueous buffer solution has a buffered pH preferably in the range of about 11 to about 13, more preferably between about 11.3 to about 11.8. The basic pH of the aqueous buffer solution is provided by the buffer additive and is critical in providing a stable emulsion. The buffering of the pH serves to prevent a breaking of the emulsion due to changes in pH which may be caused by pumping, handling, pressure and temperature surges and mixing. Further, the buffer additive of the present invention provides the desired pH of the aqueous buffer solution over a broad range of concentration of the buffer additive in the aqueous buffer solution. Thus, changes in the concentration of the buffer additive, which are to be expected over time, do not result in an aging and breaking of the emulsion.

The mixing step is carried out so as to supply sufficient energy to the mixture to yield an emulsion having the desired physical characteristics of the ORIMULSION™ end product, especially droplet size and viscosity. In general, smaller droplet sizes require more mixing energy, larger concentration of emulsifier (natural surfactant and buffer additive) or both. According to the invention, the emulsion is mixed with sufficient mixing energy to yield an average droplet size of 30 μm or less. Such an emulsion will have a viscosity below about 1500 cp at 30° C. and 1 $sec^{-1}$. A conventional mixer, for example, may suitably mix the emulsion at a rate of at least about 500 rpm. The reduced viscosity of the emulsion so formed allows the use of the viscous hydrocarbon as a source of useful combustible fuel and is obtained without the added cost of commercial surfactants.

The ratio of hydrocarbon phase to aqueous phase has been found to effect the viscosity of the emulsion. In addition, a high ratio of hydrocarbon phase to aqueous phase is desirable so as to provide a combustible emulsion suitable for atomizing and combustion as a fuel without further treatment. Thus, the ratio of hydrocarbon to aqueous buffer solution, by weight, is preferably at least 50:50 and more preferably is between about 75:25 to about 95:5. Naturally, formation of emulsions having high ratios of hydrocarbon to aqueous buffer solution will require larger concentrations of the buffer additive within the specified range.

According to a preferred embodiment of the invention, the combustible emulsion is prepared so as to provide two distinct droplet populations in the dispersed phase of the emulsion. Such an emulsion, called a bimodal emulsion, has still further improved viscosity characteristics and is prepared according to the invention without commercial surfactants.

According to the invention, a bimodal emulsion can be formed by preparing an aqueous solution of the buffer additive and providing a viscous hydrocarbon as above. Two emulsions are then formed, each having a different droplet size. The first emulsion has a large average droplet size, $D_L$, which is preferably between about 10 μm to about 40 μm, and more preferably between about 15 μm to about 30 μm. The second emulsion is formed with a small average droplet size, $D_S$, which is preferably less than or equal to about 5 μm, and more preferably less than or equal to about 2 μm.

The two emulsions are then mixed so as to form a stable bimodal emulsion, as described above, with two distinct droplet sizes, $D_L$ and $D_S$, in the dispersed phase.

It has been found that the viscosity of the bimodal emulsion is controlled by the ratio of the weight of large droplet size emulsion to the weight of small droplet size emulsion, as well as by the ratio of the average droplet size $D_L$ of the large droplet size emulsion to the average droplet size $D_S$ of the small droplet size emulsion.

Preferably, between about 70% to about 80% by weight of the dispersed hydrocarbon phase will be in the large droplet size emulsion, and the ratio of $D_L$ to $D_S$ is at least about 4 and more preferably is at least about 10. These values can be manipulated during preparation of the emulsion by altering the mixing energy used to form one or both emulsions so as to control the resulting droplet size, and also by selecting the appropriate volumes of each emulsion to be mixed.

Emulsions formed according to the invention exhibit low viscosity and good stability which greatly facilitates the use of viscous hydrocarbons as the source of combustible liquid fuel. Further, the emulsions are formed without using costly commercial emulsifiers.

The preparation of emulsions according to the invention will be further illustrated in the following examples.

EXAMPLE 1

A number of emulsions were prepared using HIPR techniques as disclosed in U.S. Pat. No. 4,934,398. A Cerro Negro natural bitumen from the Cerro Negro Oil Field in Venezuela was degassed, dehydrated and desalted to provide a starting processed viscous hydrocarbon.

The emulsions were prepared in an aqueous buffer solution containing, as a buffer additive, a water soluble amine additive marketed under the trademark INTAMINE™ by Intevep, S. A.

Emulsions were prepared having ratios, by weight, of hydrocarbon to aqueous buffer solution of 94:6, 90:10, 85:15, and 80:20, using buffer additive concentrations of between 500 ppm to 10,000 ppm.

The mixing step was carried out at 60° C. for mixing times which were controlled to yield emulsions having average droplet sizes of 2, 4, 20 and 30 μm.

These emulsions were then diluted to yield hydrocarbon/aqueous phase ratios of 70:30, 75:25, and 80:20.

All emulsions were stabilized without the use of commercial surfactants, even those having droplet sizes of less than 3 μm.

EXAMPLE 2

Emulsions were prepared using a single group buffer additive, isopropylamine, at concentrations of 6000 ppm and 7000 ppm. The emulsions were mixed at a hydrocarbon/aqueous phase ratio of 94:6, at 500 rpm. Table I below summarizes the average droplet sizes obtained at mixing times of between 0.5 to 5.0 minutes.

TABLE 1

| | DROPLET SIZE DIAMETER (microns) Buffer Concentration (ppm) | |
|---|---|---|
| Mixing time (min) | 6000 | 7000 |
| 0.5 | 7.4 | 3.7 |
| 1 | 2.4 | 1.5 |

TABLE 1-continued

| | DROPLET SIZE DIAMETER (microns) Buffer Concentration (ppm) | |
|---|---|---|
| Mixing time (min) | 6000 | 7000 |
| 2 | 1.5 | 1.3 |
| 4 | 1.4 | 1.2 |
| 5 | 1.3 | 1.2 |

As can be seen, droplet sizes well below 3 μm were obtained without the use of commercial surfactants.

EXAMPLE 3

Emulsions were prepared using several concentrations of isopropylamine as a buffer additive. Emulsions were prepared under mixing at 500 rpm for 2 minutes having a ratio of hydrocarbon to aqueous phase of 80:20 and having average droplet size and viscosity as shown below in Table 2.

TABLE 2

| Buffer Concentration (ppm) | Droplet Size Diameter (microns) | Viscosity (20/Sec) (cp) |
|---|---|---|
| 3000 | 18.45 | 800 |
| 5000 | 16.74 | 1145 |
| 7000 | 12.34 | 1285 |

EXAMPLE 4

Emulsions were prepared using a two group amine (diethylamine) at a concentration of 3000 ppm. An alkali salt, NaCl, was also added to the aqueous solution at a concentration of 50 ppm. Emulsions having hydrocarbon/aqueous phase ratios of 90:10, 85:15 and 80:20 were formed at 500 rpm having droplet sizes as shown below in Table 3.

TABLE 3

| | RATIO: BITUMEN/AQUEOUS BUFFER SOLUTION | | |
|---|---|---|---|
| Mixing Time (Min) | 90/10 | 85/15 | 80/20 |
| | Average Droplet Size Diameter (Microns) | | |
| 0.5 | 16.15 | 27.74 | 27.70 |
| 1 | 15.90 | 27.59 | 27.13 |
| 2 | 14.63 | 24.69 | 21.33 |
| 4 | 13.89 | 21.62 | 22.19 |
| 10 | 11.00 | 15.86 | 18.41 |

EXAMPLE 5

Emulsions were prepared at a mixing rate of 500 rpm using concentrations of 5000 ppm of diethylamine and 50 ppm NaCl. Table 4 shows the average droplet size obtained for these emulsions.

TABLE 4

| | RATIO: BITUMEN/AQUEOUS BUFFER SOLUTION | | | |
|---|---|---|---|---|
| Mixing Time (Min) | 94/6 | 90/10 | 85/15 | 80/20 |
| | Average Droplet Size Diameter (Microns) | | | |
| 0.5 | 7.36 | 9.69 | 11.84 | 23.50 |
| 1 | 6.85 | 9.23 | 11.70 | 21.44 |
| 2 | 6.16 | 8.87 | 11.08 | 20.55 |
| 4 | 5.02 | 8.37 | 10.49 | 18.99 |
| 10 | 3.74 | 6.67 | 9.05 | 15.68 |

EXAMPLE 6

Emulsions were prepared at a mixing rate of 500 rpm using concentrations of 7000 ppm of diethylamine and 50 ppm NaCl. Table 5 shows the average droplet size obtained.

TABLE 4

| | RATIO: BITUMEN/AQUEOUS BUFFER SOLUTION | | | |
|---|---|---|---|---|
| Mixing Time (Min) | 94/6 | 90/10 | 85/15 | 80/20 |
| | Average Droplet Size Diameter (Microns) | | | |
| 0.5 | 5.72 | 7.13 | 10.08 | 17.13 |
| 1 | 5.14 | 6.87 | 9.85 | 16.19 |
| 2 | 4.63 | 7.63 | 9.34 | 14.22 |
| 4 | 3.96 | 6.35 | 8.78 | 13.68 |
| 10 | 2.05 | 5.59 | 7.70 | 11.46 |

As shown, at concentrations of 7000 ppm, diethylamine yields emulsions having droplet size less than 3 μm without using commercial emulsifiers.

The following Examples 7–11 illustrate preparation of bimodal emulsions, according to the invention, without the use of commercial emulsifiers.

EXAMPLE 7

Emulsions were prepared using HIPR techniques as shown in U.S. Pat. No. 4,934,398 and using Cerro Negro natural bitumen from the Cerro Negro Oil Field in Venezuela. The emulsions were made as shown in Table 6 using an aqueous buffer solution of a water soluble amine, marketed under the trademark INTAMINE™, by Intevep, S. A., at concentrations of between 500 ppm and 10,000 ppm. The mixture was heated to 60° C. and stirred, changing the mixing speed and mixing time so as to obtain emulsions having average droplet sizes as indicated below in Table 6.

All emulsions were stabilized without the use of commercial surfactants or emulsifiers.

TABLE 6

| EMULSION | BITUMEN/WATER (by weight) | DROPLET DIAMETER MICRONS | VISCOSITY (cp) AT 1 $sec^{-1}$ AND 30° C. |
|---|---|---|---|
| 1 | 70/30 | 2.1 | 16,000 |
| 2 | 70/30 | 4.3 | 11,000 |
| 3 | 70/30 | 20.7 | 3,000 |
| 4 | 70/30 | 29.8 | 2,500 |
| 5 | 75/25 | 2.1 | 52,000 |
| 6 | 75/25 | 4.3 | 30,000 |
| 7 | 75/25 | 20.7 | 9,500 |
| 8 | 75/25 | 29.8 | 6,000 |
| 9 | 80/20 | 2.1 | 100,000 |
| 10 | 80/20 | 4.3 | 38,000 |
| 11 | 80/20 | 20.7 | 17,000 |
| 12 | 80/20 | 29.8 | 8,500 |

Emulsions 2 and 3, those having a hydrocarbon:water ratio of 70:30 and average droplet size distributions, respectively, of 4.3 and 20.7 microns, were mixed together in different proportions and the viscosities of the resultant bimodal emulsions were measured. The results are shown in Table 7 below.

TABLE 7

| EMULSION | % BY WEIGHT EMULSION W/MEAN DROPLET SIZE OF 4.3 MICRONS | % BY WEIGHT EMULSION W/MEAN DROPLET SIZE OF 20.7 MICRONS | VISCOSITY (cp) AT 1 $sec^{-1}$ AND 30° C. |
|---|---|---|---|
| A | 100 | 0 | 11,000 |
| B | 75 | 25 | 5,000 |
| C | 50 | 50 | 400 |
| D | 25 | 75 | 90 |
| E | 0 | 100 | 3,000 |

Table 7 shows that a relationship exists between the viscosity of the emulsion and the fraction of the hydrocarbon phase in the large droplet size emulsion (20.7 microns) and small droplet size emulsion (4.3 microns). In order to obtain the lowest viscosity value both droplet fractions must be clearly defined as two identifiable and distinct droplet sizes. Optimum viscosity is obtained at a ratio of large droplet size emulsion to small droplet size emulsion of about 75:25 by weight.

EXAMPLE 8

Bimodal emulsions containing 75% by weight of a large droplet size emulsion $D_L$ and 25% by weight of a small droplet size emulsion $D_S$ in a total hydrocarbon to water ratio in the final emulsion product of 70:30 were made from the emulsions of Table 6 as shown in Table 8 below.

TABLE 8

| EMULSION | MEAN DROPLET SIZE $D_S$ MICRONS | MEAN DROPLET SIZE $D_L$ MICRONS | RATIO: DROPLET SIZE $D_L/D_S$ | RATIO BY WT. OF EMUL. $D_L$/ EMUL. $D_S$ | VISCOSITY (cp) AT 1 $sec^{-1}$ AND 30° C. |
|---|---|---|---|---|---|
| F | 2.1 | 29.8 | 14 | 75/25 | 66 |
| G | 4.3 | 29.8 | 7 | 75/25 | 90 |
| H | 4.3 | 20.7 | 4.8 | 75/25 | 128 |

Table 8 shows the relationship between viscosity of a bimodal emulsion and the effect of the ratio of large mean droplet size to small mean droplet size ($D_L/D_S$) for emulsions with a ratio of hydrocarbon:water of 70:30% by weight. It can be seen that the bimodal emulsion viscosity increases when there is an increase in the fraction having small mean diameter droplet size. However, all the viscosity values reported for emulsions F, G and H are far below the viscosity of monomodal emulsions having 70% by weight hydrocarbon as the dispersed phase. (See Table 6)

EXAMPLE 9

With Emulsions as prepared in Example 7 and having characteristics as shown in Table 6, bimodal emulsions containing 75% by weight of a large droplet size emulsion $D_L$ and 25% by weight of a small droplet size emulsion $D_S$ in a total hydrocarbon to water ratio in the final emulsion product of 75:25 were produced as shown in Table 9.

TABLE 9

| EMULSION | MEAN DROPLET SIZE $D_S$ MICRONS | $D_L$ MICRONS | RATIO: DROPLET SIZE $D_L/D_S$ | RATIO BY WT. OF EMUL. $D_L$/ EMUL. $D_S$ | VISCOSITY (cp) AT 1 $sec^{-1}$ AND 30° C. |
|---|---|---|---|---|---|
| I | 2.1 | 20.7 | 10 | 75/25 | 180 |
| J | 4.3 | 20.7 | 4.8 | 75/25 | 600 |
| K | 2.1 | 29.8 | 14 | 75/25 | 150 |
| L | 4.3 | 29.8 | 6.9 | 75/25 | 300 |

Table 9 shows the relationship between viscosity and the ratio of large mean droplet size to small mean droplet size ($D_L/D_S$) for bimodal emulsions with an hydrocarbon to water ratio of 75:25 by weight.

It can be seen that a viscosity below 1500 cp at 1 $sec^{-1}$ and 30° C. can be obtained when the ratio of large mean droplet size to small mean droplet size ($D_L/D_S$) is greater than or equal to 4.

EXAMPLE 10

With emulsions as prepared in Example 7 and having characteristics as shown in Table 6, further bimodal emulsions having different ratios of ($D_L/D_S$) and containing 75% by weight of a large droplet size emulsion $D_L$ and 25% by weight of a small droplet size emulsion $D_S$ in a total hydrocarbon to water ratio in the final emulsion product of 80:20 were prepared as shown in Table 10.

TABLE 10

| EMULSION | MEAN DROPLET SIZE $D_S$ MICRONS | $D_L$ MICRONS | RATIO: DROPLET SIZE $D_L/D_S$ | RATIO BY WT. OF EMUL. $D_L$/ EMUL. $D_S$ | VISCOSITY (cp) AT 1 $sec^{-1}$ AND 30° C. |
|---|---|---|---|---|---|
| M | 2.1 | 20.7 | 10 | 75/25 | 1,100 |
| N | 4.3 | 20.7 | 4.8 | 75/25 | 14,000 |
| O | 2.1 | 29.9 | 14 | 75/25 | 450 |
| P | 4.3 | 29.8 | 7 | 75/25 | 7,500 |

Table 10 shows the relationship between viscosity and the ratio of large mean droplet size to small mean droplet size ($D_L/D_S$) for bimodal emulsions with a hydrocarbon:water ratio of 80:20 by weight. It can be seen that with a bimodal emulsion having a ratio of hydrocarbon:water of 80:20, in other words 80% dispersed hydrocarbon phase, it is necessary that the ratio of large mean droplet size to small mean droplet size ($D_L/D_S$) should be greater than or equal to about 10 in order to obtain a viscosity below 1500 cp at 1 $sec^{-1}$ and 30° C.

EXAMPLE 11

With the emulsions prepared in Example 7 and having characteristics as shown in Table 6, further bimodal emulsions were prepared having different ratios by weight of emulsion having large mean droplet size $D_L$ to emulsion having small mean droplet size $D_S$ as shown in Table 11.

TABLE 11

| EMULSION | MEAN DROPLET SIZE $D_S$ MICRONS | $D_L$ MICRONS | RATIO: DROPLET SIZE $D_L/D_S$ | RATIO BY WT. OF EMUL. $D_L$/ EMUL. $D_S$ | VISCOSITY (cp) AT 1 $sec^{-1}$ AND 30° C. |
|---|---|---|---|---|---|
| Q | 2.1 | 29.8 | 14 | 80/20 | 600 |
| R | 2.1 | 29.8 | 14 | 75/25 | 450 |
| S | 2.1 | 29.8 | 14 | 70/30 | 800 |
| T | 2.1 | 29.8 | 14 | 65/35 | 1,500 |

Table 11 shows the relationship between viscosity and proportion by weight of small mean droplet size to large mean droplet size ($D_L/D_S$) for bimodal emulsions with an hydrocarbon to water ratio of 80:20 by weight. It can be seen that the viscosity of a bimodal emulsion having a ratio of hydrocarbon:water of 80:20 can be modified by changing the proportion of hydrocarbon by weight in the small mean droplet and large mean droplet size emulsions. When the amount of hydrocarbon in the emulsion having small mean droplet size is increased, the viscosity first decreases and then increases.

Thus, according to the invention, combustible emulsions are prepared from viscous hydrocarbons and stabilized without the use of commercial surfactants. The emulsions so prepared exhibit excellent viscosity characteristics which are even further improved by formulating bimodal emulsions. The provision of low viscosity combustible emulsion without the added cost of commercial surfactants, provides an excellent use of viscous hydrocarbons as a source of combustible material.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A viscous hydrocarbon-in-aqueous buffer solution emulsion, comprising:

a viscous hydrocarbon discontinuous phase having a salt content by weight of less than or equal to about 15 ppm and having a water content of less than or equal to about 0.1%, said discontinuous oil phase comprises a viscous hydrocarbon having an API gravity of ≦15 and a viscosity at 1 $sec^{-1}$ and 30° C. of >5000 cps and being characterized by two distinct oil droplet sizes $D_L$ and $D_S$ wherein $D_L$ is about 10–40 μm and $D_S$ is ≦5 μm, the ratio of $D_L/D_S$ is ≧ about 4 and about 72–80% by wt. of the viscous hydrocarbon has a large droplet size $D_L$; and a basic aqueous buffer solution continuous phase containing a buffer additive and a natural surfactant, the natural surfactant being an inactive surfactant naturally contained in the viscous hydrocarbon which inactive surfactant is extracted and activated by the buffer additive so as to stabilize the viscous hydrocarbon-in-aqueous buffer solution emulsion wherein the inactive natural surfactant is selected from the group consisting of carboxylic acids, phenols, esters and mixtures thereof.

* * * * *